United States Patent [19]
Peterson

[11] Patent Number: 6,010,381
[45] Date of Patent: Jan. 4, 2000

[54] INFLATABLE TOWABLE VEHICLE

[75] Inventor: Leroy L. Peterson, Omaha, Nebr.

[73] Assignee: Sportstuff, Inc., Omaha, Nebr.

[21] Appl. No.: 09/181,504

[22] Filed: Oct. 28, 1998

[51] Int. Cl.[7] ...................................................... B63B 1/00
[52] U.S. Cl. ............................................. 441/66; 114/345
[58] Field of Search ................................... 114/242, 253, 114/345; 441/65, 66, 129, 130

[56] References Cited

U.S. PATENT DOCUMENTS

| | | | |
|---|---|---|---|
| 5,713,294 | 2/1998 | Wang | 114/345 |
| 5,782,664 | 7/1998 | Casters | 441/65 |
| 5,819,680 | 10/1998 | Haller et al. | 441/65 |

*Primary Examiner*—Jesus D. Sotelo
*Attorney, Agent, or Firm*—Henderson & Sturm

[57] ABSTRACT

An inflatable towable vehicle including an inflatable bladder having an open cockpit. A windshield is disposed at the front and along the lateral sides of the cockpit to provide passenger protection from the wind, water, or snow. The windshield is formed of an inflatable member and may be transparent or translucent to enhance passenger comfort and enjoyment. A flexible protective shell receives and protects the inflatable bladder, and serves as a stable base for attachment of towing straps, storage pockets, head rests, hand grips, and the like.

20 Claims, 2 Drawing Sheets

INFLATABLE TOWABLE VEHICLE

BACKGROUND OF THE INVENTION

1. Field of the Invention

The present invention relates generally to inflatable recreational devices, and more particularly to an inflatable towable vehicle for use on water or snow.

2. Description of Related Art

Inflatable towable vehicles for recreational water or snow use include many structures and designs ranging the simple tire inner tube to complex devices. These structures and designs, likewise, provide a wide range of passenger protection from the wind, water, and snow. None of the known devices, however, provide a windshield type structure for the protection and comfort of the passengers.

BRIEF SUMMARY OF THE INVENTION

Briefly stated, the present invention provides an inflatable towable vehicle including an inflatable bladder having an open cockpit. A windshield is disposed at the front and along the lateral sides of the cockpit to provide passenger protection from the wind, water, or snow. The windshield is formed of an inflatable member and may be transparent or translucent to enhance passenger comfort and enjoyment. A flexible protective shell receives and protects the inflatable bladder, and serves as a stable base for attachment of towing straps, storage pockets, head rests, hand grips, and the like.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
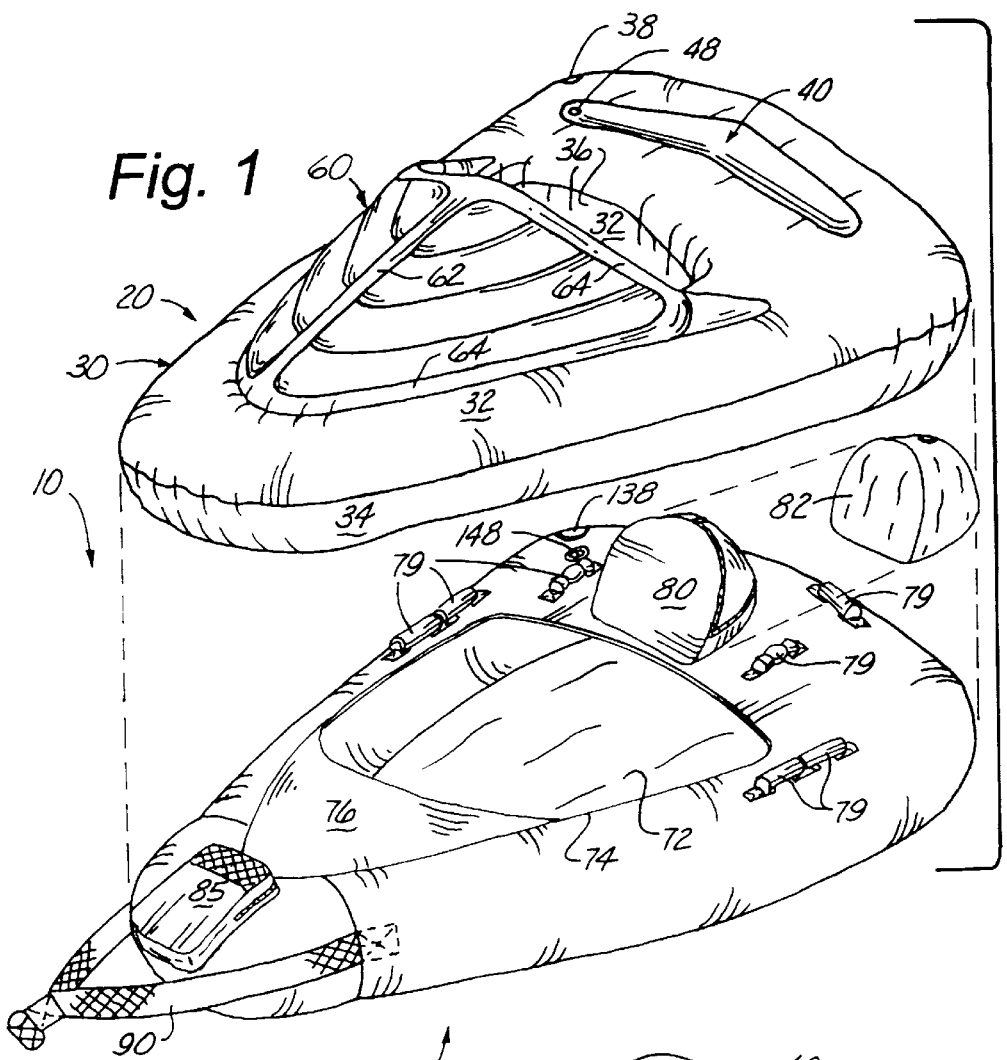
FIG. 1 is an exploded perspective view of the inflatable towable vehicle of the present invention.

As can be seen by reference to the drawings, and in particularly to FIG. 1, the inflatable towable vehicle 10 of the present invention includes a main inflatable member 20 and a flexible protective shell 70. The main inflatable member 20 is constructed of four separately inflatable components: a body member 30, a reinforcing insert 40, a floor panel 50, and a windshield 60.

Figure 2:
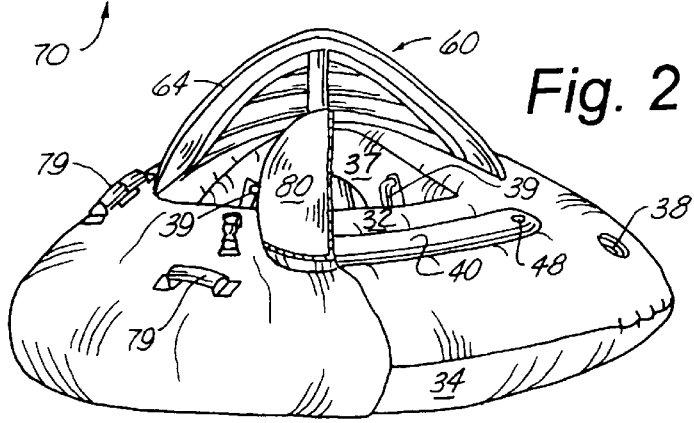
FIG. 2 is a rear elevational view with portions cutaway to show the construction ofthe device.
Figure 3:
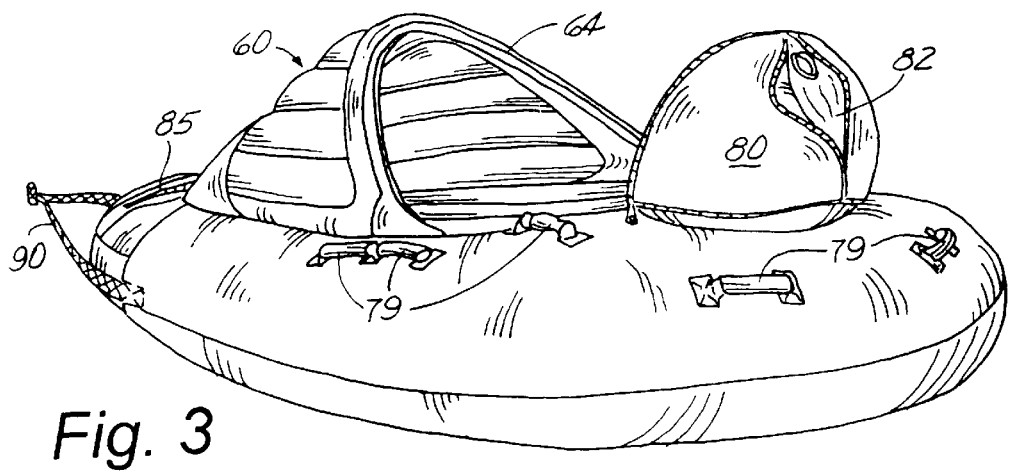
FIG. 3 is a rear perspective view showing the inflatable head rest with the flexible pocket open.

The body member 30 includes an outer wedge shaped hull having an upper surface 32, a lower surface 34, and a wedge shaped central open area 36 defined by interior walls 37. The body member 30 is inflated and deflated through a valve 38 located on a rear portion of the body member 30. Hand grips 39 (FIG. 2) are attached to the interior wall 37.

The reinforcing insert 40 is positioned at the rear of the body member 30 to completely fill a cavity that extends between the upper and lower surfaces 32, 34 of the body member 30. The insert 40 provides vertical and horizontal support in the relatively large area at the rear of the body member 30. The insert 40 is independently inflatable and deflatable through a valve 48.

The floor panel 50 is attached to the lower surface 34 of the body member 30 and extends across the bottom of the wedge shaped central open area 36 to form a wedge shaped passenger cockpit. The floor panel 50 is independently inflatable and deflatable through a valve 58.

Figure 4:
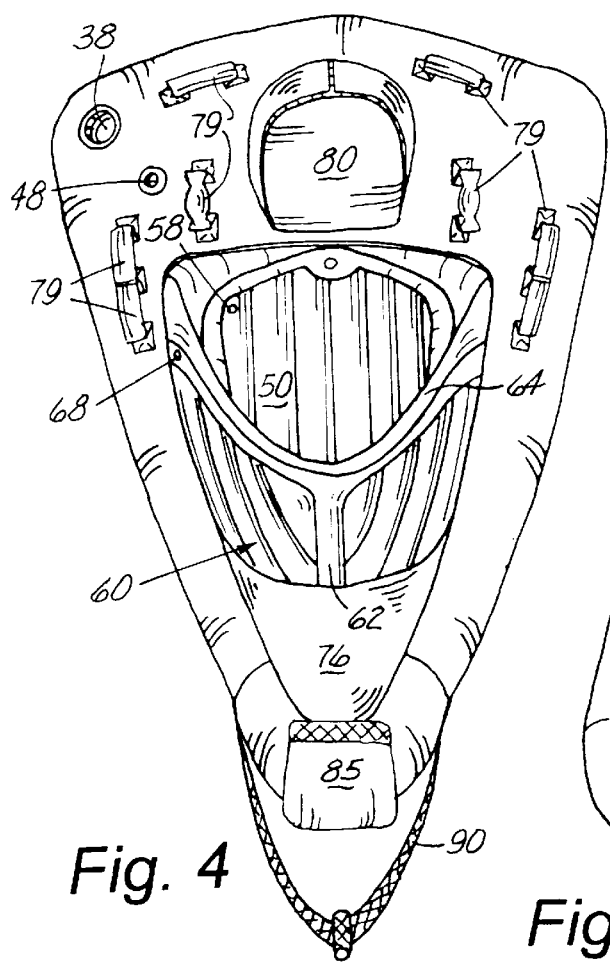
FIG. 4 is a top plan view thereof.

The windshield 60 is attached to the upper surface 32 of the body member 30 at the front of and along the lateral sides of the cockpit. The windshield 60 extends up and back from the front of the cockpit, and up and in from the sides of the cockpit to enclose approximately two thirds of the wedge shaped cockpit (FIG. 4). The windshield 60 is independently inflatable and deflatable through a valve 68. The material of construction for the windshield 60 may be transparent or translucent to enhance the comfort and enjoyment of the passengers. Also, the windshield surface may carry various silk screened designs. The windshield 60 is formed with pleats and a reinforced central rib 62 and reinforced edges 64 to increase stability.

The body member 30, insert 40, floor 50, and windshield 60 may be formed of any suitable material that holds air under pressure, such as polyvinylchloride sheet. Also, the components are attached to one another by suitable procedures to make them airtight such as thermo welding.

The partially inflated main member 20 is received within the flexible protective shell 70 through a top opening 72. The body member 30 and insert 40 are then fully inflated through openings 138 and 148 registerable with the valves 38 and 48 so that it is matingly received within the shell 70. The edge 74 of the top opening 72 is disposed adjacent the cockpit at the rear and at sides, and a shell front portion 76 overlies a front portion of the windshield 60.

Figure 5:
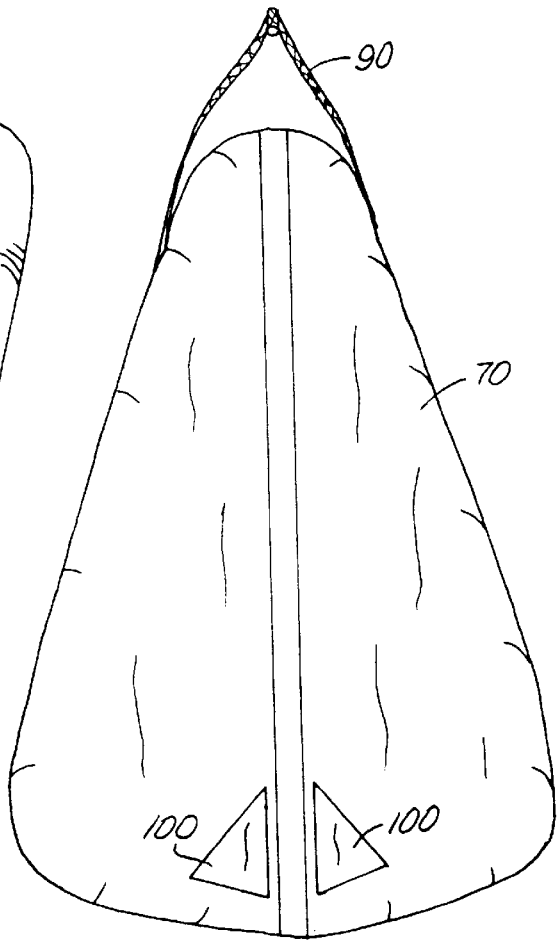
FIG. 5 is a bottom plan view thereof.

A number of hand grips 79 are attached to the shell 70 spaced to the side and rear of the cockpit. An inflatable headrest 80 is also attached to the shell 70 at the rear of the cockpit adjacent the edge 74. It is to be understood that the headrest 80 could also be positioned back from the edge 74 to act as a backrest for passengers sitting up on the back section with only their feet in the cockpit. The headrest 80 includes a separately inflatable bladder 82 that is secured within a flexible envelope. A zippered mesh top storage pocket 85 is attached to the front of the shell 70, as is a towing strap 90. A pair of drain vents 100 are formed in the lower rear section of the shell 70 (FIG. 5) to allow water to escape from between the main inflatable member 20 and the shell 70.

In use, the inflatable towable vehicle of the present invention provides the passengers with maximum comfort and protection from the wind, water, or snow when they are in the cockpit behind the windshield 60. Other amenities such as the hand grips 39, 79, the headrest 80 and the storage pocket 85 add to the comfort, safety, and enjoyment of the passengers in an outdoor recreational experience.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. An inflatable towable vehicle, comprising:

an inflatable body member including an outer hull having an upper surface, a lower surface, and a central open area;

a floor panel attached to the hull adjacent the lower surface and disposed to extend across the central open area to form an open cockpit, the cockpit including a front, a rear, and lateral sides; and a windshield attached to the upper surface of the hull at the front of and along the lateral sides of the cockpit, the windshield being disposed to extend upwardly and rearwardly from the front of the cockpit, and being disposed upwardly and inwardly from the lateral sides of the cockpit to enclose a forward section of the cockpit wherein the windshield is an inflatable member.

2. The inflatable towable vehicle of claim 1 wherein the inflatable windshield is a closed inflatable chamber separate from the inflatable body member.

3. The inflatable towable vehicle of claim 2 wherein the inflatable windshield includes a reinforced edge.

4. The inflatable towable vehicle of claim 3 wherein the inflatable windshield includes a reinforced central rib.

5. The inflatable towable vehicle of claim 2 wherein the windshield is transparent.

6. The inflatable towable vehicle of claim 2 wherein the windshield is translucent.

7. The inflatable towable vehicle of claim 1 wherein the windshield is transparent.

8. The inflatable towable vehicle of claim 1 wherein the windshield is translucent.

9. The inflatable towable vehicle of claim 1 wherein the inflatable body member is wedge shaped.

10. The inflatable towable vehicle of claim 9 wherein the cockpit is wedge shaped.

11. The inflatable towable vehicle of claim 1 further including hand grips attached to the lateral sides of the cockpit.

12. The inflatable towable vehicle of claim 1 wherein the floor is a closed inflatable cavity separate from the inflatable body member.

13. An inflatable towable vehicle comprising:

an inflatable body member including an outer hull having an upper surface, a lower surface, and a central open area;

a floor panel attached to the hull adjacent the lower surface and disposed to extend across the central open area to form an open cockpit, the cockpit including a front, a rear, and lateral sides; and a windshield attached to the upper surface of the hull at the front of and along the lateral sides of the cockpit, the windshield being disposed to extend upwardly and rearwardly from the front of the cockpit, and being disposed upwardly and inwardly from the lateral sides of the cockpit to enclose a forward section of the cockpit.

14. The inflatable towable vehicle of claim 13 Wherein the top opening of the shell includes an edge which is disposed at the upper surface of the inflatable body member adjacent the cockpit.

15. The inflatable towable vehicle of claim 14 wherein the edge of the shell overlies a front portion of the windshield.

16. The inflatable towable vehicle of claim 13 wherein the flexible shell carries a plurality of hand grips.

17. The inflatable towable vehicle of claim 13 further including an inflatable head rest attached to the flexible shell at the rear of the cockpit.

18. The inflatable towable vehicle of claim 13 further including a storage pocket attached to the flexible shell at a front portion thereof.

19. The inflatable towable vehicle of claim 13 further including a towing strap attached to the flexible shell at a front portion thereof.

20. The inflatable towable vehicle of claim 13 wherein drain vents are formed in a lower rear section of the flexible shell.

* * * * *